UNITED STATES PATENT OFFICE.

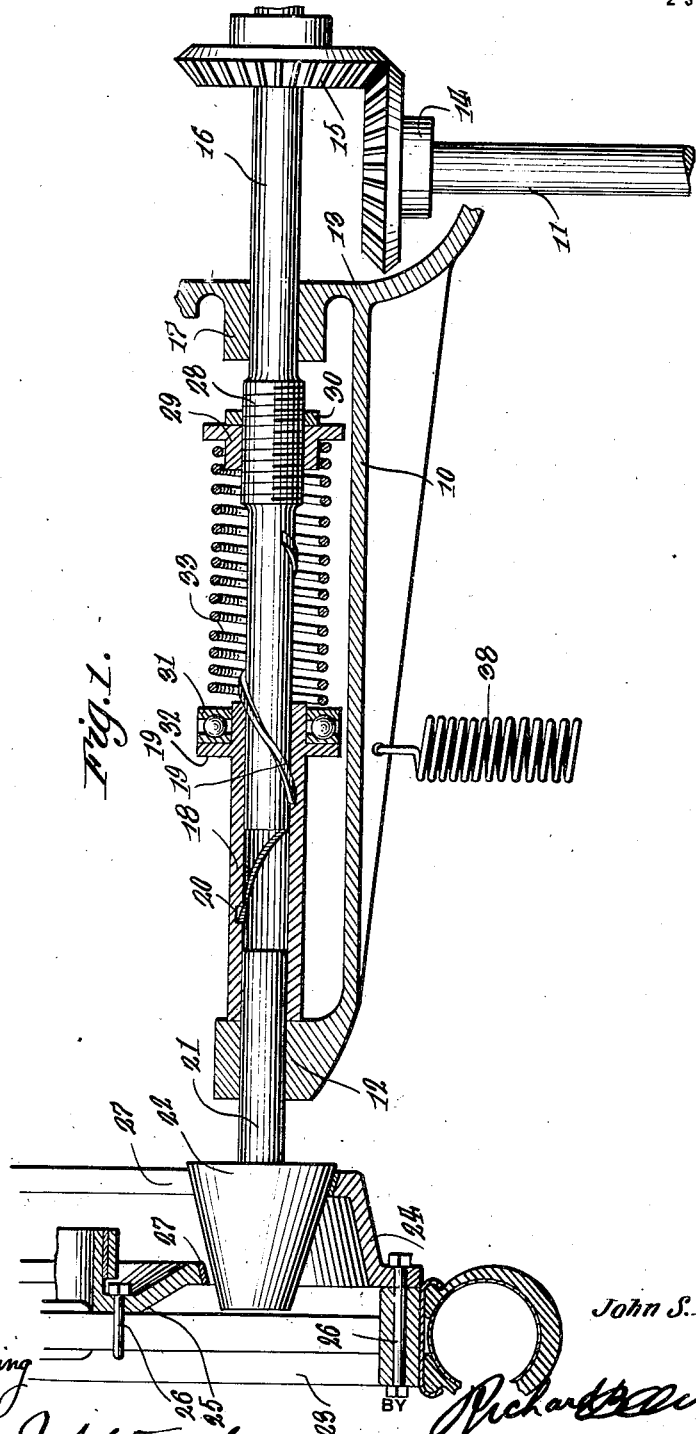

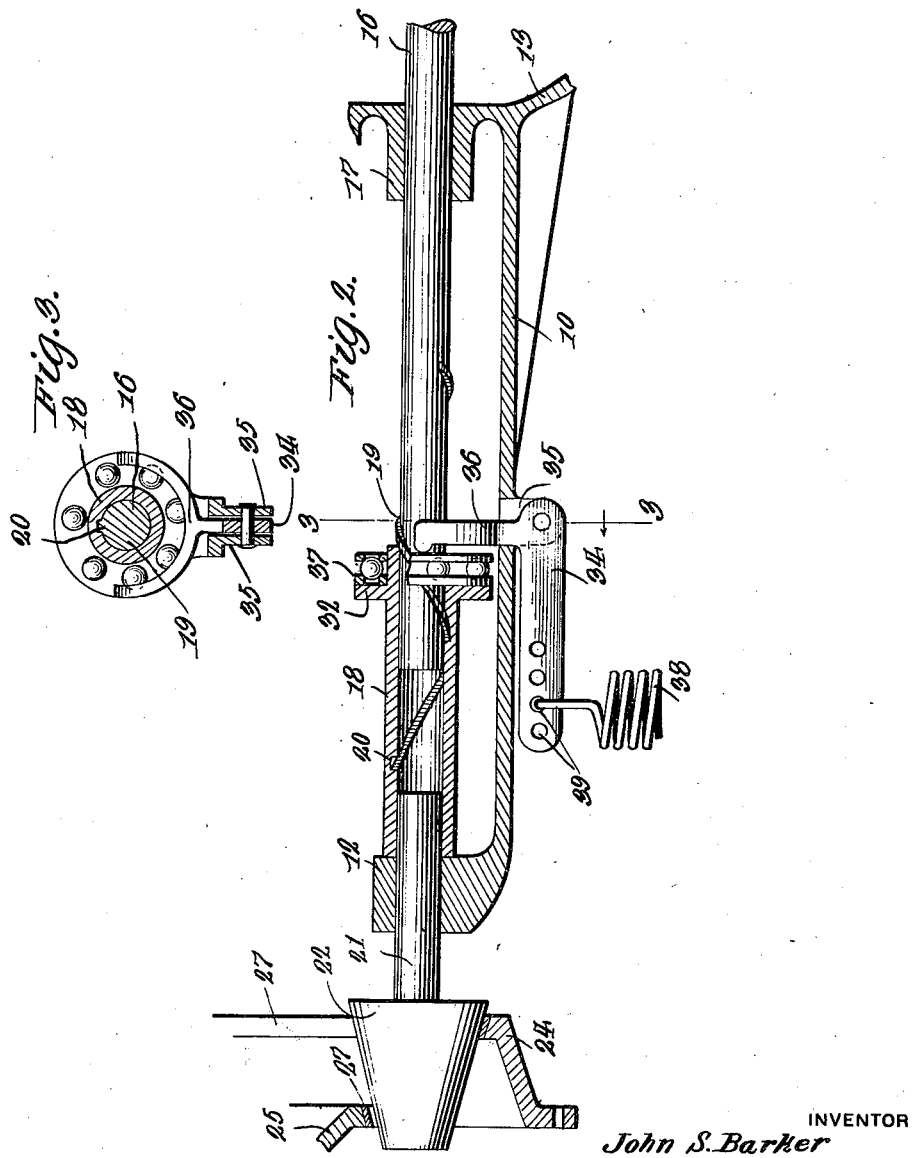

JOHN S. BARKER, OF ROCHESTER, NEW YORK.

TRANSMISSION.

1,262,737.      Specification of Letters Patent.     Patented Apr. 16, 1918.

Application filed February 8, 1917. Serial No. 147,439.

*To all whom it may concern:*

Be it known that I, JOHN S. BARKER, a citizen of the United States, residing at Rochester, in the county of Monroe and State of New York, have invented certain new and useful Improvements in Transmissions, of which the following is a specification.

This invention relates to an improved transmission and the principal object of the invention is to provide a transmission for an automobile which will automatically accommodate itself to the load and cause the cone engaging the disk of the wheel to be drawn inwardly thus reducing the speed rotation of the wheel.

Another object of the invention is to so construct the transmission that the cone for transmitting rotary movement to the driving wheel will be normally held extended outwardly and in engagement with the disk for driving the automobile forwardly.

Another object of the invention is to provide a transmission which will dispense with the clutch, shifting gears and differential gears commonly used and which will do away with the necessity of changing gears to accommodate the motor to varying loads.

Another object of the invention is to provide a transmission in which the driving and the driven members are in constant contact resulting in no loss of momentum while speed ratios between motor and driving wheels are being changed.

Another object of the invention is to provide a transmission which will be efficient in operation, and comprise a comparatively few number of parts, easy to assemble and not liable to break or get out of order.

This invention is illustrated in the accompanying drawings, wherein:—

Figure 1 is a view showing the transmission partially in section and partially in plan.

Fig. 2 is a view similar to Fig. 1 showing a slightly modified form of the transmission.

Fig. 3 is a sectional view taken along the line 3—3 of Fig. 2.

The transmission as illustrated discloses a shaft housing 10 which will of course extend upon both sides of the driving shaft 11 and will be provided at each end with a bearing 12 and with a gear housing 13 intermediate its length, gear housing inclosing the gears 14 and 15 mounted upon the driving shaft 11 and driven shaft 16 and being provided at opposite sides with bearings 17 for the driven shaft 16. This driven shaft has each end fitted into a sleeve 18 and provided with a thread or worm 19 engaging the coöperating thread 20 of the sleeve. This sleeve carries the stub shaft or spindle 21 for the cone 22 and as the spindle is securely fastened in the sleeve, the cone will be moved inwardly and outwardly when the sleeve is moved longitudinally. In order to transmit movement to the driving wheels, one of which is shown and indicated by the numeral 23, there has been provided disks 24 and 25 which will be secured to the wheels by fasteners 26 and be positioned with the cone extending between them as clearly shown in Figs. 1 and 2. These disks have their cone engaging edges coated or covered with strips 27 which will provide a good frictional engagement between the cone and whichever disk the cone is in contact with. When driving the automobile forwardly, the cone will engage disk 24 and when driving the machine rearwardly, the axle casing will be moved rearwardly by any suitable shifting means to bring the cone into engagement with the disk 25. By means of the axle casing shifting mechanism referred to, the casing may be moved to hold the cone out of engagement with the disks of the driving wheels and the engine can then run without the automobile being moved. So far the structure shown in Figs. 1 and 2, is the same and therefore similar reference numerals have been used.

In the form shown in Fig. 1, the driven shaft 16 is provided with an enlarged threaded section 28 having an abutment collar 29 screwed thereon and locked against movement toward the gear housing by the locking nut 30. A ball-bearing 31 is placed upon the sleeve 18 against the abutment collar 32 and is engaged by the spring 33 which is positioned between the abutment collar 29 and the ball-bearing 31. Therefore the spring will serve to hold the sleeve and driven shaft normally in the position shown in Fig. 1 but will permit the driven shaft to rotate relatively to the sleeve at any time when the load is great enough to overcome the tension of the spring, thus drawing the sleeve and cone inwardly until by reason of the changed ratio of speed between the driven shaft and the wheel, the load will balance the tension of the spring. When the load ceases to be excessive, the spring will act to restore the cone to its normal position of high speed ratio. It will thus be seen that this inward and outward movement of the cone will be automatic and will be controlled by the varying conditions of the load.

In Figs. 2 and 3, there is shown a modification of the structure in which the spring 33 and abutment collar 29 is omitted together with the threaded section 28 of the driven shaft and abutment or locking nut 30. In this form, a bell crank lever 34 will be pivotally connected with the ear 35 of the shaft housing and will extend with its forked end 36 extending into the shaft housing and engaging the ball bearing 37 mounted upon the sleeve 18, the ball bearing 37 being of the same construction as that shown in Fig. 1. The spring 38 which in Fig. 1 is connected with the axle casing to hold the cone 22 in engagement with the disk 24, will in this form be connected with the outer arm of the bell crank lever, a plurality of openings 39 being provided for adjustment. With this structure, the spring together with the bell crank lever will serve to normally draw the axle casing forwardly and will further serve to yieldably hold the sleeve 18 extended outwardly and will return the sleeve to the normal position after having been drawn inwardly through excessive load. I have thus provided an improved transmission so constructed that when running under normal conditions, the cone will be held extended outwardly and in engagement with the disk 24 thus driving the wheels 23 at full speed ratio and have further provided a transmission so constructed that when driving under heavy load, the rotation of the driven shaft will act upon the sleeve 18 thus drawing the cone inwardly until the cone has been drawn inwardly to the proper point for imparting the correct speed of rotation to the driving wheels of the automobile. Therefore this transmission will accommodate itself to varying conditions when traveling along a road and going up and down hill.

Having thus described the invention, what I claim as new and desire to protect by Letters Patent, is:—

1. A transmission comprising a driving shaft, a shaft housing, a driven shaft rotatably supported by said shaft housing and receiving rotary movement from said driving shaft, a sleeve threaded upon said driven shaft whereby rotary movement of the driven shaft relatively to the sleeve will draw said sleeve inwardly upon the driven shaft, means engaging the sleeve to yieldably hold the sleeve in an extended position upon the driven shaft, a driven wheel, a gear plate carried by said driven wheel, a cone for transmitting rotary movement to the wheel through engagement with the gear plate, and a spindle for said cone rotatably supported by the shaft housing and fitting into said sleeve whereby said cone and spindle will be rotated with and moved longitudinally with the sleeve.

2. A transmission comprising a driving shaft, a rotatably mounted driven shaft receiving rotary movement from said driving shaft, a sleeve threaded upon the driven shaft, a spindle fitting into said sleeve, a gear carried by said spindle, and means for yieldably holding the sleeve in an extended position, rotation of the driven shaft relatively to the sleeve drawing the sleeve inwardly.

3. A transmission comprising a driving shaft, a shaft housing, a driven shaft rotatably supported in said shaft housing and rotated from said driving shaft, a sleeve fitting upon the driven shaft and having threaded engagement therewith whereby rotation of the driven shaft relatively to the sleeve will draw the sleeve inwardly upon the driven shaft, a spindle rotatably carried by the shaft housing and engaged by said sleeve, a gear head carried by the spindle, and means for yieldably holding the sleeve extended upon the driven shaft.

4. A transmission comprising a driving shaft, a driven shaft rotated from said driving shaft, a sleeve threaded upon the driven shaft whereby rotation of the driven shaft will draw said sleeve inwardly upon the same, means for moving the sleeve outwardly upon the driven shaft, and means carried by the sleeve for transmitting rotary movement to the driven wheel of a vehicle.

5. A transmission comprising a driving shaft, a shaft housing, a driven shaft rotatably mounted in the shaft housing and rotated from the driving shaft, a sleeve threaded upon the driven shaft, a driven wheel, friction disks carried by the driven wheel, a stub shaft carried by the sleeve and provided with a gear head, extending between the disks of the driven wheel, a bell crank lever pivotally carried by the shaft housing and engaging the sleeve, and resilient means connected with the bell crank lever for moving the bell crank lever and yieldably holding the sleeve extended and serving to draw the axle casing and yieldably hold the gear head of the stub shaft in engagement with one of the disks of the driven wheel.

6. A transmission comprising a driving shaft, a shaft housing, a driven shaft rotatably supported by the shaft housing and rotated from the driving shaft, a sleeve threaded upon the driven shaft, means carried by the sleeve for transmitting rotary movement to the driving wheel of a vehicle, a bell crank lever pivotally carried by the axle casing and engaging the sleeve, and resilient means connected with the bell crank lever.

In testimony whereof I affix my signature in presence of two witnesses.

JOHN S. BARKER.

Witnesses:
JOSEPH H. KIMMEL,
H. F. BARBOUR.